Patented Sept. 18, 1951

2,568,672

UNITED STATES PATENT OFFICE 2,568,672

METHYL SILOXANE RUBBER

Earl Leathen Warrick, Pittsburgh, Pa., assignor to Dow Corning Corporation, Midland, Mich., a corporation of Michigan No Drawing. Application March 29, 1948, Serial No. 17,799

5 Claims. (Cl. 260—205)

The present application is in part a continuation of my copending application Serial No. 557,056, filed October 3, 1944, now Patent Number 2,460,795.

The present invention relates to materials which can be vulcanized to mechanically strong elastic materials and to methods for the vulcanization thereof, and in particular, methods for the vulcanization thereof with the formation of foam rubber.

Objects of the present invention are the provision of vulcanizable organosiloxane containing pastes which can be vulcanized by heating to form organosiloxane rubber and the provision of methods for the vulcanization of such pastes for the production of foam rubber.

Compositions in accordance herewith comprises a liquid methyl polysiloxane of viscosity above 1,000 centistokes, preferably between 10,000 and 1,000,000 centistokes. All of the organic radicals in the polysiloxane are methyl radicals, which are present in average amount between 1.75 and 2.25 methyl radicals per silicon atom. The liquid methylpolysiloxane contains at least 40 mol per cent of $(CH_3)_2SiO$. A filler is incorporated in the liquid methylpolysiloxane in amount to form a pasty mass. There is included in the paste so formed from 2 to 6 per cent of benzoyl peroxide based on the weight of the methylpolysiloxane.

The liquids which are employed are the methylpolysiloxanes which have heretofore been discussed in the art. Those which are employed in accordance herewith contain as indicated from 1.75 to 2.25 methyl radicals per silicon atom and at least 40 mol per cent of $(CH_3)_2SiO$. Preferred liquids are the dimethylpolysiloxane liquids, i. e. siloxanes in which two methyl radicals are linked to each silicon atom. The viscosity of the liquid may vary from 1,000 centistokes upward. Extremely viscous fluids may be employed. It is to be noted that these are entirely distinct from so called gels and gums. Thus, the gels and gums are characteristicly insoluble in organic solvents. Materials similar to the products of the present invention may be produced by milling a filler into such a gel or gum. The product of milling the filler into gel or gum is elastic in character due to the base polymer having been gelled. The products of the present invention do not have this elastic character. They may therefore be spread on a surface without the material tending to draw together after being spread. This property gives the products of the present invention extremely wide utility. They may be used as paints or other coatings and they may further be used as caulking compositions. Products made from gels are not suitable for any of these applications.

The benzoyl peroxide is incorporated in the paste in the amount of from 2 to 6 per cent based on the weight of the siloxane. It is convenient to add the benzoyl peroxide in the commercial form in which it is precipitated on a carrier, such as a calcium sulfate.

The filler which is added is in amount sufficient to form a pasty mass of the liquid polysiloxane. To form such a pasty mass which can be handled readily in production, there should be employed between 50 and 200 parts of filler per 100 parts of the methylpolysiloxane liquid. Thus, with the low viscosity liquids, if less than 50 parts of filler are employed, the composition is too fluid whereas with the high viscosity liquids the composition is too heavy if more than 200 parts of filler are employed.

Any suitable fillers may be employed such as asbestos, clay, hydrated calcium silicate, zinc sulfide, silica areogel, barium titanate, glass fiber floc, iron oxide, bentonite, zinc oxide, titania, magnesia, micronized graphite, micronized slate, micronized mica, celite, $PbO_2$, PbO, blue lead, and alumina either hydrated or dehydrated. The fillers should be heat resistant inorganic materials melting above 350° C. When it is desired to produce a foam rubber from the paste, it is preferred to employ a powdered filler rather than a fibrous filler though the fiberous fillers may be used if desired.

While the compositions above described are of general applicability as indicated, a particular utility of these compositions is in the production of foam rubber. For the vulcanization of these pastes in general it is necessary that the paste be heated to a temperature above 100° C. The vulcanization takes place immediately. Continued heating modifiers the stress strain properties of the vulcanized product and is generally desirable. In order to produce foam rubber, the pastes above described are heated at above 100° C. in a space of sufficient size to permit expansion. Thus, the paste may be heated either in a partially filled mold to give a molded sponge rubber or it may be heated as on a sheet to give a sheet foam rubber.

In the manufacture of sheet foam rubber it is convenient to heat the paste between two sheets of metal with the upper sheet resting on the upper surface of the paste. This produces a more even surface on the product and prevents defects such as blow holes. Suitable sheet metal for this purpose includes galvanized iron or steel, sheet aluminum and sheet magnesium. Any conventional mold release agents may be employed if desired to assist in obtaining release of the plates from the foam rubber.

Example 1

100 parts of dimethylpolysiloxane having a viscosity of 15,000 centistokes was mixed with 4 to 6 parts of benzoyl peroxide and 50 parts of iron oxide. The benzoyl peroxide employed was used in the form of a commercial product which contains 23 per cent benzoyl peroxide precipitated on calcium sulfate. The paste so obtained was placed in a mold and the mold was closed so that there was no space for expansion. The mold was then heated at 150° C. for one half hour. A solid product was obtained having elastic properties. The paste was likewise placed in a mold of sufficient size to permit expansion of the reaction product and heated at 150° C. for one half hour. A molded foam rubber was thereby obtained.

Example 2

Four pastes were prepared from dimethylpolysiloxane fluids of viscosities equal to 2,290 centistokes, 13,460 centistokes, 21,120 centistokes, and 70,544 centistokes. These siloxane fluids in amount equal to 100 parts thereof were mixed individually with 150 parts of titanium dioxide and 5 parts of benzoyl peroxide. The pastes so formed were separately agitated in a dough mixture and milled on a 5 roll mill to obtain complete dispersion of the filler and benzoyl peroxide. Each paste was vulcanized to an elastomer by molding it at 162° C. for five minutes in a mold without room for expansion. Each of the solid molded products so produced was then subjected to a subsequent heat treatment for four hours at 260° C. to improve the stress strain properties. The tensile and elongation of each of these polymers is shown in the following table.

| Viscosity of Polymers, in cs. | Tensile, lbs./in.² | Elongation, Per Cent |
|---|---|---|
| 2,290 | 372 | 135 |
| 13,460 | 333 | 198 |
| 21,120 | 336 | 162 |
| 70,544 | 342 | 253 |

Each of these pastes was spread on a sheet of metal to a thickness of about ⅛ inch. A sheet of 4 mil glass cloth laid thereover and a second layer of paste spread over the glass cloth to a thickness of ⅛ inch. A sheet of metal was laid over the composite of paste and glass fabric and the assembly heated for 10 minutes in an air oven at 200° C. There was thereby obtained in each instance a foam rubber sheet, after removal of the sheet metal, with a layer of glass fabric reinforcement in the center.

Example 3

A very viscous dimethylpolysiloxane fluid having a Williams plastometer of 60 was employed. The plasticity was measured at room temperature using a 2 cc. sample of the fluid with the fluid held in the plastometer for 3 minutes prior to making the reading. 100 parts of this fluid were mixed with 100 parts of titania and 5 parts of benzoyl peroxide. The paste so formed was spread on a layer of sheet metal to a thickness of 1/16 inch with a layer of 4 mil glass cloth through the center thereof as described in Example 2. A second sheet of metal was laid over the paste and the assembly placed in an oven at 150° C. for 15 minutes. The assembly was then removed from the oven. The plates were removed from the vulcanized product, which was a foam rubber reinforced with the layer of glass fabric.

Example 4

A dimethylpolysiloxane fluid of 15,000 cs. in amount of 100 parts was mixed with 50 parts of titania and 2.5 parts of benzoyl peroxide. This material was heated in a mold placed in a press with no room for expansion. The heating in the press was continued for 5 minutes at 130° C. The vulcanized product was removed and heated in an air oven for 4 hours at 250° C. A solid rubbery product was obtained. A half inch layer of the paste was also placed between sheet metal plates. The assembly of paste with the two plates was placed in an air oven at 175° C. for 15 minutes. The plates were then removed from the vulcanized product which was a foam rubber.

In each of the above examples it should be noted that when the paste is heated between two sheet metal plates no pressure is placed on the upper plate. The paste is allowed to expand during vulcanization whereby the upper plate is raised.

That which is claimed is:

1. A process of preparing new synthetic materials from a liquid methylpolysiloxane all of the organic radicals of which are methyl radicals having on the average between 1.75 and 2.25 methyl radicals per silicon atom, and at least 40 mol per cent of diorganosubstituted units of the formula $(CH_3)_2SiO$ and having a viscosity above 1,000 cs., which comprises vulcanizing said liquid methylpolysiloxane by heating a mixture of said siloxane, from 2 to 6 per cent benzoyl peroxide and a filler in amount sufficient to form a pasty mass which vulcanizing is effected by heating at a temperature above 100° C., in a space of sufficient size to permit expansion of the mixture during vulcanizing, whereby a methylpolysiloxane foam elastomer is obtained.

2. A process of preparing new synthetic materials which comprises vulcanizing a dimethylpolysiloxane liquid above 1,000 cs. viscosity, by heating a mixture of said liquid, from 2 to 6 per cent benzoyl peroxide and a filler in amount sufficient to form a pasty mass, said heating being conducted at a temperature above 100° C., in a space of sufficient size to permit expansion of the mixture during vulcanizing, whereby a dimethylpolysiloxane foam elastomer is obtained.

3. A process of preparing new synthetic materials which comprises mixing a dimethylpolysiloxane liquid of 10,000 to 1,000,000 cs. viscosity with a filler, and from 2 to 6 per cent benzoyl peroxide based on the weight of dimethylpolysiloxane fluid, and vulcanizing the mixture so produced by heating it at a temperature above 100° C., in a space of sufficient size to permit expansion of the mixture during vulcanizing, whereby a dimethylpolysiloxane foam elastomer is obtained.

4. A composition comprising a liquid methylpolysiloxane of viscosity above 1,000 cs., having on the average between 1.75 and 2.25 methyl radicals per silicon atom, there being present in said polysiloxane at least 40 mol per cent $(CH_3)_2SiO$ a filler in amount sufficient to form a pasty mass and from 2 to 6 per cent benzoyl peroxide based on the weight of methylpolysiloxane.

5. A composition comprising a liquid polydimethylsiloxane of viscosity 10,000 to 1,000,000 cs., a filler in amount sufficient to form a pasty mass and from 2 to 6 per cent benzoyl peroxide based on the weight of the dimethylpolysiloxane.

EARL LEATHEN WARRICK.

REFERENCES CITED

The following references are of record in the file of this patent:

UNITED STATES PATENTS

| Number | Name | Date |
|---|---|---|
| 2,011,041 | DePhillips | Aug. 13, 1935 |
| 2,049,507 | McBurney et al. | Aug. 4, 1936 |
| 2,409,633 | Kropa | Oct. 22, 1946 |
| 2,445,794 | Marsden | July 27, 1948 |
| 2,452,416 | Wright | Oct. 26, 1948 |
| 2,460,795 | Warrick | Feb. 1, 1949 |
| 2,481,052 | Warrick | Sept. 6, 1949 |

FOREIGN PATENTS

| Number | Country | Date |
|---|---|---|
| 345,197 | Great Britain | Mar. 9, 1931 |